US009306634B2

(12) United States Patent
Low et al.

(10) Patent No.: US 9,306,634 B2
(45) Date of Patent: Apr. 5, 2016

(54) WAKING UP A WIRELESS POWER TRANSMITTER FROM BEACON MODE

(75) Inventors: Zhen Ning Low, San Diego, CA (US); Kevin Douglas Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1116 days.

(21) Appl. No.: 13/352,122

(22) Filed: Jan. 17, 2012

(65) Prior Publication Data

US 2012/0223589 A1 Sep. 6, 2012

Related U.S. Application Data

(60) Provisional application No. 61/448,127, filed on Mar. 1, 2011.

(51) Int. Cl.
| *H01F 27/42* | (2006.01) |
| *H04B 5/00* | (2006.01) |
| *H02J 5/00* | (2006.01) |
| *H02J 17/00* | (2006.01) |
| *H02J 7/02* | (2006.01) |

(52) U.S. Cl.
CPC .............. *H04B 5/0037* (2013.01); *H02J 5/005* (2013.01); *H02J 17/00* (2013.01); *H02J 7/025* (2013.01); *Y04S 20/225* (2013.01)

(58) Field of Classification Search
CPC ........ H04B 5/0037; H02J 17/00; H02J 5/005; H02J 7/025
See application file for complete search history.

(56) References Cited

U.S. PATENT DOCUMENTS

| 7,915,858 B2 | 3/2011 | Liu et al. |
| 7,952,322 B2 | 5/2011 | Partovi et al. |
| 2003/0234730 A1 * | 12/2003 | Arms ...................... H02J 17/00 340/870.01 |
| 2010/0201202 A1 | 8/2010 | Kirby et al. |
| 2010/0213895 A1 | 8/2010 | Keating et al. |

FOREIGN PATENT DOCUMENTS

| WO | WO9742695 A1 | 11/1997 |
| WO | WO2010131983 A1 | 11/2010 |
| WO | WO2011007300 A2 | 1/2011 |

OTHER PUBLICATIONS

International Search Report and Written Opinion—PCT/US2012/026502—ISA/EPO—Apr. 12, 2012.

* cited by examiner

*Primary Examiner* — Daniel Cavallari
(74) *Attorney, Agent, or Firm* — Knobbe Martens Olson & Bear LLP

(57) ABSTRACT

This disclosure provides systems, methods and apparatus for waking a wireless power transmitter from beacon mode. In one aspect a wireless power receiver apparatus is provided. The wireless power receiver apparatus includes a receive circuit comprising a receive coil. This receive circuit is coupled to a load. The receive circuit is configured to wirelessly receive power from a transmitter device at a first power level to power the load. The wireless power receiver apparatus further includes an adjustment circuit configured to be powered by using the wirelessly received power. The adjustment circuit is further configured to adjust a characteristic of the load using the wirelessly received power for a period of time to cause a detectable change in an operating characteristic of the transmitter device for the period of time.

30 Claims, 11 Drawing Sheets

WAKING UP A WIRELESS POWER TRANSMITTER FROM BEACON MODE

CROSS REFERENCE TO RELATED APPLICATIONS

This application claims priority under 35 U.S.C. §119(e) to U.S. Provisional Patent Application No. 61/448,127 entitled "WAKING UP A WIRELESS POWER TRANSMITTER FROM BEACON MODE" filed on Mar. 1, 2011, the disclosure of which is hereby incorporated by reference in its entirety.

FIELD

The present invention relates generally to wireless power. More specifically, the disclosure is directed to waking a wireless power transmitter from a low power mode.

BACKGROUND

An increasing number and variety of electronic devices are powered via rechargeable batteries. Such devices include mobile phones, portable music players, laptop computers, tablet computers, computer peripheral devices, communication devices (e.g., Bluetooth devices), digital cameras, hearing aids, and the like. While battery technology has improved, battery-powered electronic devices increasingly require and consume greater amounts of power. As such, these devices constantly require recharging. Rechargeable devices are often charged via wired connections that require cables or other similar connectors that are physically connected to a power supply. Cables and similar connectors may sometimes be inconvenient or cumbersome and have other drawbacks. Wireless charging systems that are capable of transferring power in free space to be used to charge rechargeable electronic devices may overcome some of the deficiencies of wired charging solutions. As such, wireless charging systems and methods that efficiently and safely transfer power for charging rechargeable electronic devices are desirable.

SUMMARY OF THE INVENTION

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a wireless power receiver apparatus. The wireless power receiver apparatus includes a receive circuit comprising a receive coil. The receive circuit is coupled to a load. The receive circuit is configured to wirelessly receive power from a transmitter device at a first power level to power the load. The wireless power receiver apparatus further includes an adjustment circuit configured to be powered by using the wirelessly received power. The adjustment circuit is further configured to adjust a characteristic of the load using the wirelessly received power for a period of time to cause a detectable change in an operating characteristic of the transmitter device for the period of time.

Another aspect of the disclosure provides an implementation of a method for waking a wireless power transmitter from a low power mode. The method includes wirelessly receiving power from a transmitter device at a first power level to power a load. The method further includes adjusting an operating characteristic of the load using the wirelessly received power during a period of time to cause a detectable change in an operating characteristic of the transmitter device for the period of time.

Yet another aspect of the disclosure provides a wireless power receiver apparatus. The wireless power receiver apparatus includes means for wirelessly receiving power. The means for wirelessly receiving power is coupled to a load. The means for wirelessly receiving power is configured to wirelessly receive power from a means for wirelessly transmitting power at a first power level to power the load. The wireless power receiver apparatus further includes means for adjusting configured to be powered by using the wirelessly received power. The means for adjusting is further configured to adjust a characteristic of the load using the wirelessly received power for a period of time to cause a detectable change in an operating characteristic of the means for wirelessly transmitting for the period of time.

Another aspect of the disclosure provides a wireless power transmitter apparatus. The wireless power transmitter apparatus includes a transmit circuit comprising a transmit coil. The transmit circuit is configured to wirelessly transmit power at a first level so as to charge or power a receiver device. The wireless power transmitter apparatus further includes a transmit controller circuit configured cause the transmit circuit to wirelessly transmit power at a second level in response to a detected change in an operating characteristic based on an action of the receiver device. The second power level is higher than the first power level.

Another aspect of the disclosure provides an implementation of a method for waking from a low power mode. The method includes wirelessly transmitting power a first power level for a determined period of time so as to power or charge a receiver device. The method further includes detecting a change in an operating characteristic based on an action of the receiver device. The method further includes wirelessly transmitting power at a second power level in response to the detected change. The second power level is higher than the first power level.

Another aspect of the disclosure provides a wireless power transmitter apparatus. The wireless power transmitter apparatus includes means for wirelessly transmitting power being configured to wirelessly transmit power at a first level for a determined period of time so as to power or charge a means for wirelessly receiving power. The wireless power transmitter apparatus further includes means for controlling configured cause the means for wirelessly transmitting power to wirelessly transmit power at a second level in response to a detected change in an operating characteristic based on an action of the means for wirelessly receiving power. The second power level is higher than the first power level.

Figure 1:
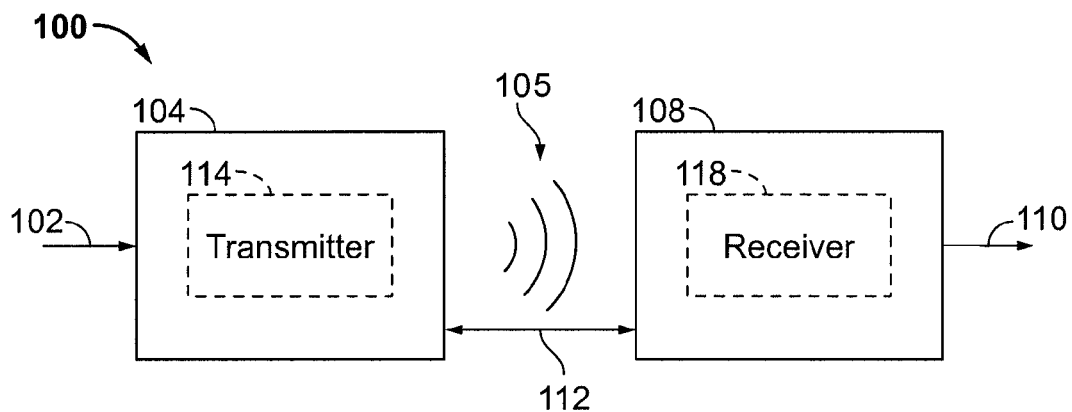
FIG. 1 is a functional block diagram of an exemplary wireless power transfer system, in accordance with exemplary embodiments of the invention.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary embodiments of the invention and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. The exemplary embodiments of the invention may be practiced without these specific details. In some instances, well-known structures and devices are shown in block diagram form in order to avoid obscuring the novelty of the exemplary embodiments presented herein.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer.

FIG. 1 is a functional block diagram of an exemplary wireless power transfer system 100, in accordance with exemplary embodiments of the invention. Input power 102 may be provided to a transmitter 104 from a power source (not shown) for generating a field 105 for providing energy transfer. A receiver 108 may couple to the field 105 and generate output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship. When the resonant frequency of receiver 108 and the resonant frequency of transmitter 104 are substantially the same or very close, transmission losses between the transmitter 104 and the receiver 108 are minimal. As such, wireless power transfer may be provided over larger distance in contrast to purely inductive solutions that may require large coils that require coils to be very close (e.g., mms). Resonant inductive coupling techniques may thus allow for improved efficiency and power transfer over various distances and with a variety of coil configurations.

The receiver 108 may receive power when the receiver 108 is located in an energy field 105 produced by the transmitter 104. The field 105 corresponds to a region where energy output by the transmitter 104 may be captured by a receiver 108. In some cases, the field 105 may correspond to the "near-field" of the transmitter 104 as will be further described below. The transmitter 104 may include a transmit coil 114 for outputting an energy transmission. The receiver 108 further includes a receive coil 118 for receiving or capturing energy from the energy transmission. The near-field may correspond to a region in which there are strong reactive fields resulting from the currents and charges in the transmit coil 114 that minimally radiate power away from the transmit coil 114. In some cases the near-field may correspond to a region that is within about one wavelength (or a fraction thereof) of the transmit coil 114. The transmit and receive coils 114 and 118 are sized according to applications and devices to be associated therewith. As described above, efficient energy transfer may occur by coupling a large portion of the energy in a field 105 of the transmit coil 114 to a receive coil 118 rather than propagating most of the energy in an electromagnetic wave to the far field. When positioned within the field 105, a "coupling mode" may be developed between the transmit coil 114 and the receive coil 118. The area around the transmit and receive coils 114 and 118 where this coupling may occur is referred to herein as a coupling-mode region.

Figure 2:
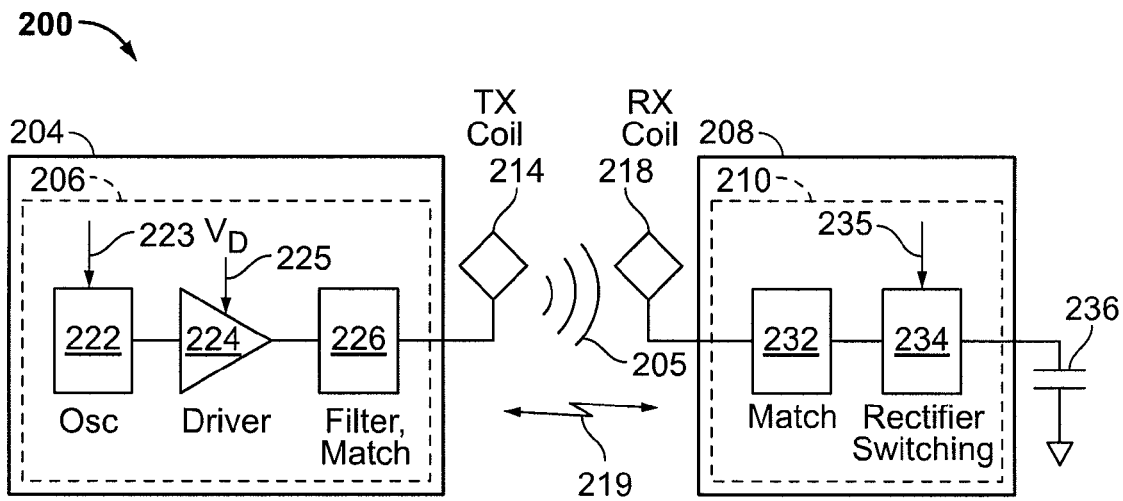
FIG. 2 is a functional block diagram of exemplary components that may be used in the wireless power transfer system of FIG. 1, in accordance with various exemplary embodiments of the invention.

FIG. 2 is a functional block diagram of exemplary components that may be used in the wireless power transfer system 100 of FIG. 1, in accordance with various exemplary embodiments of the invention. The transmitter 204 may include transmit circuitry 206 that may include an oscillator 222, a driver circuit 224, and a filter and matching circuit 226. The oscillator 222 may be configured to generate a signal at a desired frequency, such as 468.75 KHz, 6.78 MHz or 13.56 MHz, that may be adjusted in response to a frequency control signal 223. The oscillator signal may be provided to a driver circuit 224 configured to drive the transmit coil 214 at, for example, a resonant frequency of the transmit coil 214. The driver circuit 224 may be a switching amplifier configured to receive a square wave from the oscillator 222 and output a sine wave. For example, the driver circuit 224 may be a class E amplifier. A filter and matching circuit 226 may be also included to filter out harmonics or other unwanted frequencies and match the impedance of the transmitter 204 to the transmit coil 214.

The receiver 208 may include receive circuitry 210 that may include a matching circuit 232 and a rectifier and switching circuit 234 to generate a DC power output from an AC power input to charge a battery 236 as shown in FIG. 2 or to power a device (not shown) coupled to the receiver 108. The matching circuit 232 may be included to match the impedance of the receive circuitry 210 to the receive coil 218. The receiver 208 and transmitter 204 may additionally communicate on a separate communication channel 219 (e.g., Bluetooth, zigbee, cellular, etc). The receiver 208 and transmitter 204 may alternatively communicate via in-band signaling using characteristics of the wireless field 205.

As described more fully below, receiver 208, that may initially have a selectively disablable associated load (e.g., battery 236), may be configured to determine whether an amount of power transmitted by transmitter 204 and receiver by receiver 208 is appropriate for charging a battery 236. Further, receiver 208 may be configured to enable a load (e.g., battery 236) upon determining that the amount of power is appropriate. In some embodiments, a receiver 208 may be configured to directly utilize power received from a wireless power transfer field without charging of a battery 236. For example, a communication device, such as a near-field communication (NFC) or radio-frequency identification device (RFID may be configured to receive power from a wireless power transfer field and communicate by interacting with the wireless power transfer field and/or utilize the received power to communicate with a transmitter 204 or other devices.

Figure 3:
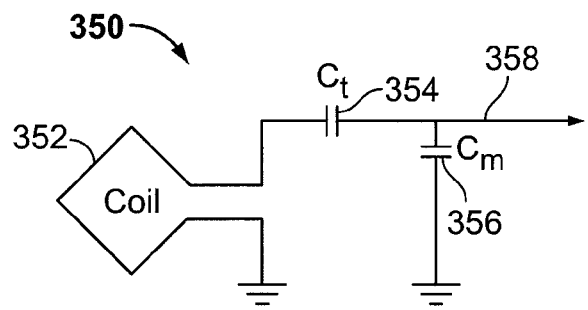
FIG. 3 is a schematic diagram of a portion of transmit circuitry or receive circuitry of FIG. 2 including a transmit or receive coil, in accordance with exemplary embodiments of the invention.

FIG. 3 is a schematic diagram of a portion of transmit circuitry 206 or receive circuitry 210 of FIG. 2 including a transmit or receive coil 352, in accordance with exemplary embodiments of the invention. As illustrated in FIG. 3, transmit or receive circuitry 350 used in exemplary embodiments may include a coil 352. The coil may also be referred to or be configured as a "loop" antenna 352. The coil 352 may also be referred to herein or be configured as a "magnetic" antenna or an induction coil. The term "coil" is intended to refer to a component that may wirelessly output or receive energy for coupling to another "coil." The coil may also be referred to as an "antenna" of a type that is configured to wirelessly output or receive power. The coil 352 may be configured to include an air core or a physical core such as a ferrite core (not shown). An air core coil 352 allows the placement of other components within the core area. Air core coils may be somewhat susceptible to detuning when certain types of extraneous physical devices are placed in the vicinity of the core. However, an air core may more readily enable placement of the receive coil 218 (FIG. 2) within a plane of the transmit coil 214 (FIG. 2) where the coupled-mode region of the transmit coil 214 (FIG. 2) may be more powerful.

As stated, efficient transfer of energy between the transmitter 104 and receiver 108 may occur during matched or nearly matched resonance between the transmitter 104 and the receiver 108. However, even when resonance between the transmitter 104 and receiver 108 are not matched, energy may be transferred, although the efficiency may be affected. Transfer of energy occurs by coupling energy from the field 105 of the transmitting coil to the receiving coil residing in the neighborhood where this field 105 is established rather than propagating the energy from the transmitting coil into free space.

The resonant frequency of the loop or magnetic coils is based on the inductance and capacitance. Inductance may be simply the inductance created by the coil 352, whereas, capacitance may be added to the coil's inductance to create a resonant structure at a desired resonant frequency. As a non-limiting example, capacitor 352 and capacitor 354 may be added to the transmit or receive circuitry 350 to create a resonant circuit that selects a signal 356 at a resonant frequency. Accordingly, for larger diameter coils, the size of capacitance needed to sustain resonance may decrease as the diameter or inductance of the loop increases. Furthermore, as the diameter of the coil increases, the efficient energy transfer area of the near-field may increase. Other resonant circuits formed using other components are also possible. As another non-limiting example, a capacitor may be placed in parallel between the two terminals of the coil 350. For transmit coils, a signal 358 with a frequency that substantially corresponds to the resonant frequency of the coil 352 may be an input to the coil 352.

In one embodiment, the transmitter 104 may be configured to output a time varying magnetic field with a frequency corresponding to the resonant frequency of the transmit coil 114. When the receiver is within the field 105, the time varying magnetic field may induce a current in the receive coil 118. As described above, if the receive coil 118 is configured to be resonant at the frequency of the transmit coil 118, energy may be efficiently transferred. The AC signal induced in the receive coil 118 may be rectified as described above to produce a DC signal that may be provided to charge or to power a load.

Figure 4:
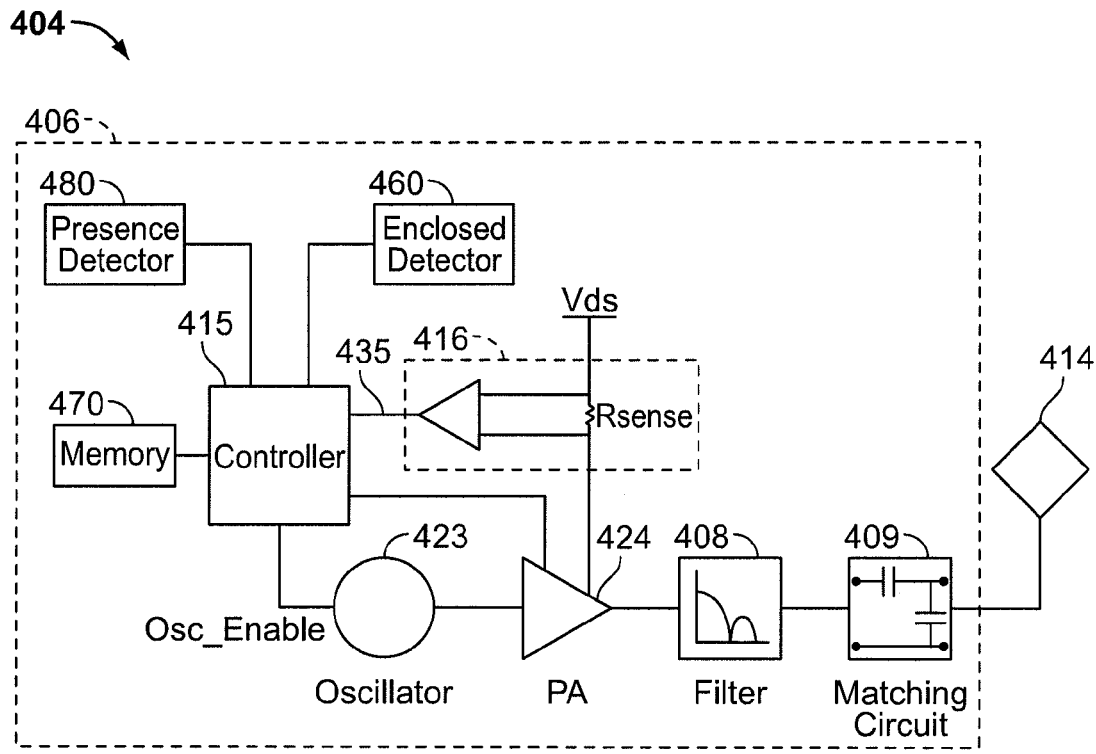
FIG. 4 is a functional block diagram of a transmitter that may be used in the wireless power transfer system of FIG. 1, in accordance with exemplary embodiments of the invention.

FIG. 4 is a functional block diagram of a transmitter 404 that may be used in the wireless power transfer system of FIG. 1, in accordance with exemplary embodiments of the invention. The transmitter 404 may include transmit circuitry 406 and a transmit coil 414. The transmit coil 414 may be the coil 352 as shown in FIG. 3. Transmit circuitry 406 may provide RF power to the transmit coil 414 by providing an oscillating signal resulting in generation of energy (e.g., magnetic flux) about the transmit coil 414. Transmitter 404 may operate at any suitable frequency. By way of example, transmitter 404 may operate at the 13.56 MHz ISM band.

Transmit circuitry 406 may include a fixed impedance matching circuit 409 for matching the impedance of the transmit circuitry 406 (e.g., 50 ohms) to the transmit coil 414 and a low pass filter (LPF) 408 configured to reduce harmonic emissions to levels to prevent self-jamming of devices coupled to receivers 108 (FIG. 1). Other exemplary embodiments may include different filter topologies, including but not limited to, notch filters that attenuate specific frequencies while passing others and may include an adaptive impedance match, that may be varied based on measurable transmit metrics, such as output power to the coil 414 or DC current drawn by the driver circuit 424. Transmit circuitry 406 further includes a driver circuit 424 configured to drive an RF signal as determined by an oscillator 423. The transmit circuitry 406 may be comprised of discrete devices or circuits, or alternately, may be comprised of an integrated assembly. An exemplary RF power output from transmit coil 414 may be on the order of 2.5 Watts.

Transmit circuitry 406 may further include a controller 415 for selectively enabling the oscillator 423 during transmit phases (or duty cycles) for specific receivers, for adjusting the frequency or phase of the oscillator 423, and for adjusting the output power level for implementing a communication protocol for interacting with neighboring devices through their attached receivers. It is noted that the controller 415 may also be referred to herein as processor 415. Adjustment of oscillator phase and related circuitry in the transmission path may allow for reduction of out of band emissions, especially when transitioning from one frequency to another.

The transmit circuitry 406 may further include a load sensing circuit 416 for detecting the presence or absence of active receivers in the vicinity of the near-field generated by transmit coil 414. By way of example, a load sensing circuit 416 monitors the current flowing to the driver circuit 424, that may be affected by the presence or absence of active receivers in the vicinity of the field generated by transmit coil 414 as will be further described below. Detection of changes to the loading on the driver circuit 424 are monitored by controller 415 for use in determining whether to enable the oscillator 423 for transmitting energy and to communicate with an active receiver. As described more fully below, a current measured at the driver circuit 424 may be used to determine whether an invalid device is positioned within a wireless power transfer region of the transmitter 404.

The transmit coil 414 may be implemented with a Litz wire or as an antenna strip with the thickness, width and metal type selected to keep resistive losses low. In a one implementation, the transmit coil 414 may generally be configured for association with a larger structure such as a table, mat, lamp or other less portable configuration. Accordingly, the transmit coil 414 generally may not need "turns" in order to be of a practical dimension. An exemplary implementation of a transmit coil 414 may be "electrically small" (i.e., fraction of the wavelength) and tuned to resonate at lower usable frequencies by using capacitors to define the resonant frequency.

The transmitter 404 may gather and track information about the whereabouts and status of receiver devices that may be associated with the transmitter 404. Thus, the transmit circuitry 406 may include a presence detector 480, an enclosed detector 460, or a combination thereof, connected to the controller 415 (also referred to as a processor herein). The controller 415 may adjust an amount of power delivered by the driver circuit 424 in response to presence signals from the presence detector 480 and the enclosed detector 460. The transmitter 404 may receive power through a number of power sources, such as, for example, an AC-DC converter (not shown) to convert conventional AC power present in a building, a DC-DC converter (not shown) to convert a conventional DC power source to a voltage suitable for the transmitter 404, or directly from a conventional DC power source (not shown).

As a non-limiting example, the presence detector 480 may be a motion detector utilized to sense the initial presence of a device to be charged that is inserted into the coverage area of the transmitter 404. After detection, the transmitter 404 may be turned on and the RF power received by the device may be used to toggle a switch on the Rx device in a pre-determined manner, which in turn results in changes to the driving point impedance of the transmitter 404.

As another non-limiting example, the presence detector 480 may be a detector capable of detecting a human, for example, by infrared detection, motion detection, or other suitable means. In some exemplary embodiments, there may be regulations limiting the amount of power that a transmit coil 414 may transmit at a specific frequency. In some cases, these regulations are meant to protect humans from electromagnetic radiation. However, there may be environments where a transmit coil 414 is placed in areas not occupied by humans, or occupied infrequently by humans, such as, for example, garages, factory floors, shops, and the like. If these environments are free from humans, it may be permissible to increase the power output of the transmit coil 414 above the normal power restrictions regulations. In other words, the controller 415 may adjust the power output of the transmit coil 414 to a regulatory level or lower in response to human presence and adjust the power output of the transmit coil 414 to a level above the regulatory level when a human is outside a regulatory distance from the electromagnetic field of the transmit coil 414.

As a non-limiting example, the enclosed detector 460 (may also be referred to herein as an enclosed compartment detector or an enclosed space detector) may be a device such as a sense switch for determining when an enclosure is in a closed or open state. When a transmitter is in an enclosure that is in an enclosed state, a power level of the transmitter may be increased.

In exemplary embodiments, a method by which the transmitter 404 does not remain on indefinitely may be used. In this case, the transmitter 404 may be programmed to shut off after a user-determined amount of time. This feature prevents the transmitter 404, notably the driver circuit 424, from running long after the wireless devices in its perimeter are fully charged. This event may be due to the failure of the circuit to detect the signal sent from either the repeater or the receive coil that a device is fully charged. To prevent the transmitter 404 from automatically shutting down if another device is placed in its perimeter, the transmitter 404 automatic shut off feature may be activated only after a set period of lack of motion detected in its perimeter. The user may be able to determine the inactivity time interval, and change it as desired. As a non-limiting example, the time interval may be longer than that needed to fully charge a specific type of wireless device under the assumption of the device being initially fully discharged.

Figure 5:
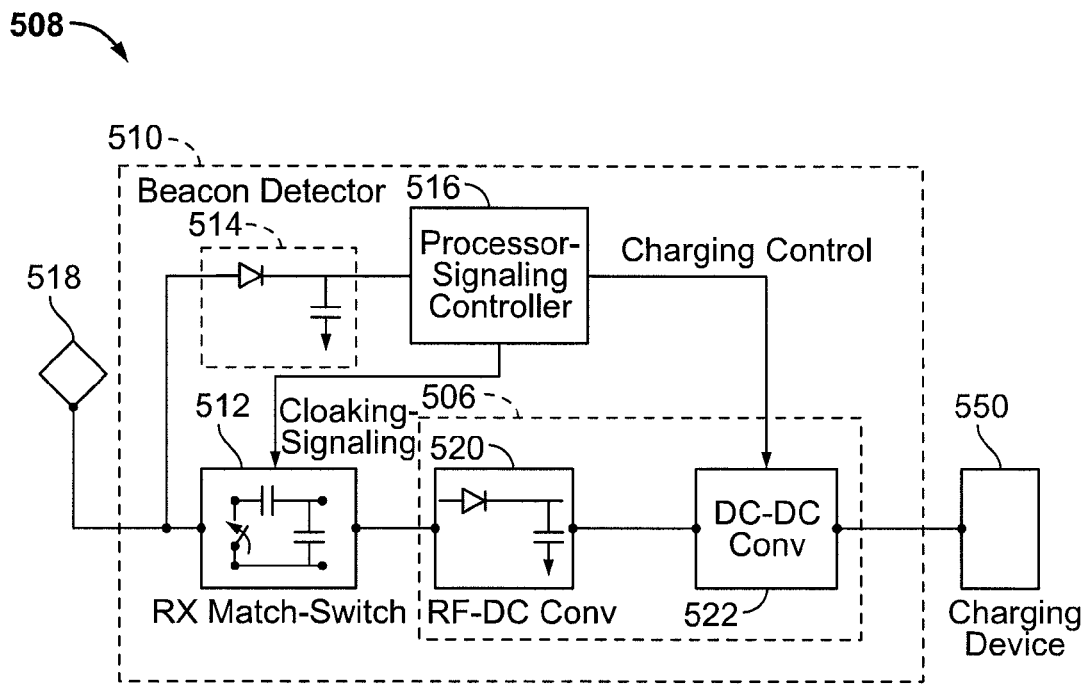
FIG. 5 is a functional block diagram of a receiver that may be used in the wireless power transfer system of FIG. 1, in accordance with exemplary embodiments of the invention.

FIG. 5 is a functional block diagram of a receiver 508 that may be used in the wireless power transfer system of FIG. 1, in accordance with exemplary embodiments of the invention. The receiver 508 includes receive circuitry 510 that may include a receive coil 518. Receiver 508 further couples to device 550 for providing received power thereto. It should be noted that receiver 508 is illustrated as being external to device 550 but may be integrated into device 550. Energy may be propagated wirelessly to receive coil 518 and then coupled through the rest of the receive circuitry 510 to device 550. By way of example, the charging device may include devices such as mobile phones, portable music players, laptop computers, tablet computers, computer peripheral devices, communication devices (e.g., Bluetooth devices), digital cameras, hearing aids (and other medical devices), and the like.

Receive coil 518 may be tuned to resonate at the same frequency, or within a specified range of frequencies, as transmit coil 414 (FIG. 4). Receive coil 518 may be similarly dimensioned with transmit coil 414 or may be differently sized based upon the dimensions of the associated device 550. By way of example, device 550 may be a portable electronic device having diametric or length dimension smaller that the diameter of length of transmit coil 414. In such an example, receive coil 518 may be implemented as a multi-turn coil in order to reduce the capacitance value of a tuning capacitor (not shown) and increase the receive coil's impedance. By way of example, receive coil 518 may be placed around the substantial circumference of device 550 in order to maximize the coil diameter and reduce the number of loop turns (i.e., windings) of the receive coil 518 and the inter-winding capacitance.

Receive circuitry 510 may provide an impedance match to the receive coil 518. Receive circuitry 510 includes power conversion circuitry 506 for converting a received RF energy source into charging power for use by the device 550. Power conversion circuitry 506 includes an RF-to-DC converter 520 and may also in include a DC-to-DC converter 522. RF-to-DC converter 520 rectifies the RF energy signal received at receive coil 518 into a non-alternating power with an output voltage represented by $V_{rect}$. The DC-to-DC converter 522 (or other power regulator) converts the rectified RF energy signal into an energy potential (e.g., voltage) that is compatible with device 550 with an output voltage and output current represented by $V_{out}$ and $I_{out}$. Various RF-to-DC converters are contemplated, including partial and full rectifiers, regulators, bridges, doublers, as well as linear and switching converters.

Receive circuitry 510 may further include switching circuitry 512 for connecting receive coil 518 to the power conversion circuitry 506 or alternatively for disconnecting the power conversion circuitry 506. Disconnecting receive coil 518 from power conversion circuitry 506 not only suspends charging of device 550, but also changes the "load" as "seen" by the transmitter 404 (FIG. 2).

As disclosed above, transmitter 404 includes load sensing circuit 416 that may detect fluctuations in the bias current provided to transmitter driver circuit 424. Accordingly, transmitter 404 has a mechanism for determining when receivers are present in the transmitter's near-field.

When multiple receivers 508 are present in a transmitter's near-field, it may be desirable to time-multiplex the loading and unloading of one or more receivers to enable other receivers to more efficiently couple to the transmitter. A receiver 508 may also be cloaked in order to eliminate coupling to other nearby receivers or to reduce loading on nearby transmitters. This "unloading" of a receiver is also known herein as a "cloaking." Furthermore, this switching between unloading and loading controlled by receiver 508 and detected by transmitter 404 may provide a communication mechanism from receiver 508 to transmitter 404 as is explained more fully below. Additionally, a protocol may be associated with the switching that enables the sending of a message from receiver 508 to transmitter 404. By way of example, a switching speed may be on the order of 100 µsec.

In an exemplary embodiment, communication between the transmitter 404 and the receiver 508 refers to a device sensing and charging control mechanism, rather than conventional two-way communication (i.e., in band signaling using the coupling field). In other words, the transmitter 404 may use on/off keying of the transmitted signal to adjust whether energy is available in the near-field. The receiver may interpret these changes in energy as a message from the transmitter 404. From the receiver side, the receiver 508 may use tuning and de-tuning of the receive coil 518 to adjust how much power is being accepted from the field. In some cases, the tuning and de-tuning may be accomplished via the switching circuitry 512. The transmitter 404 may detect this difference in power used from the field and interpret these changes as a message from the receiver 508. It is noted that other forms of modulation of the transmit power and the load behavior may be utilized.

Receive circuitry 510 may further include signaling detector and beacon circuitry 514 used to identify received energy fluctuations, that may correspond to informational signaling from the transmitter to the receiver. Furthermore, signaling and beacon circuitry 514 may also be used to detect the transmission of a reduced RF signal energy (i.e., a beacon signal) and to rectify the reduced RF signal energy into a nominal power for awakening either un-powered or power-depleted circuits within receive circuitry 510 in order to configure receive circuitry 510 for wireless charging.

Receive circuitry 510 further includes processor 516 for coordinating the processes of receiver 508 described herein including the control of switching circuitry 512 described herein. Cloaking of receiver 508 may also occur upon the occurrence of other events including detection of an external wired charging source (e.g., wall/USB power) providing charging power to device 550. Processor 516, in addition to controlling the cloaking of the receiver, may also monitor beacon circuitry 514 to determine a beacon state and extract messages sent from the transmitter 404. Processor 516 may also adjust the DC-to-DC converter 522 for improved performance.

Figure 6:
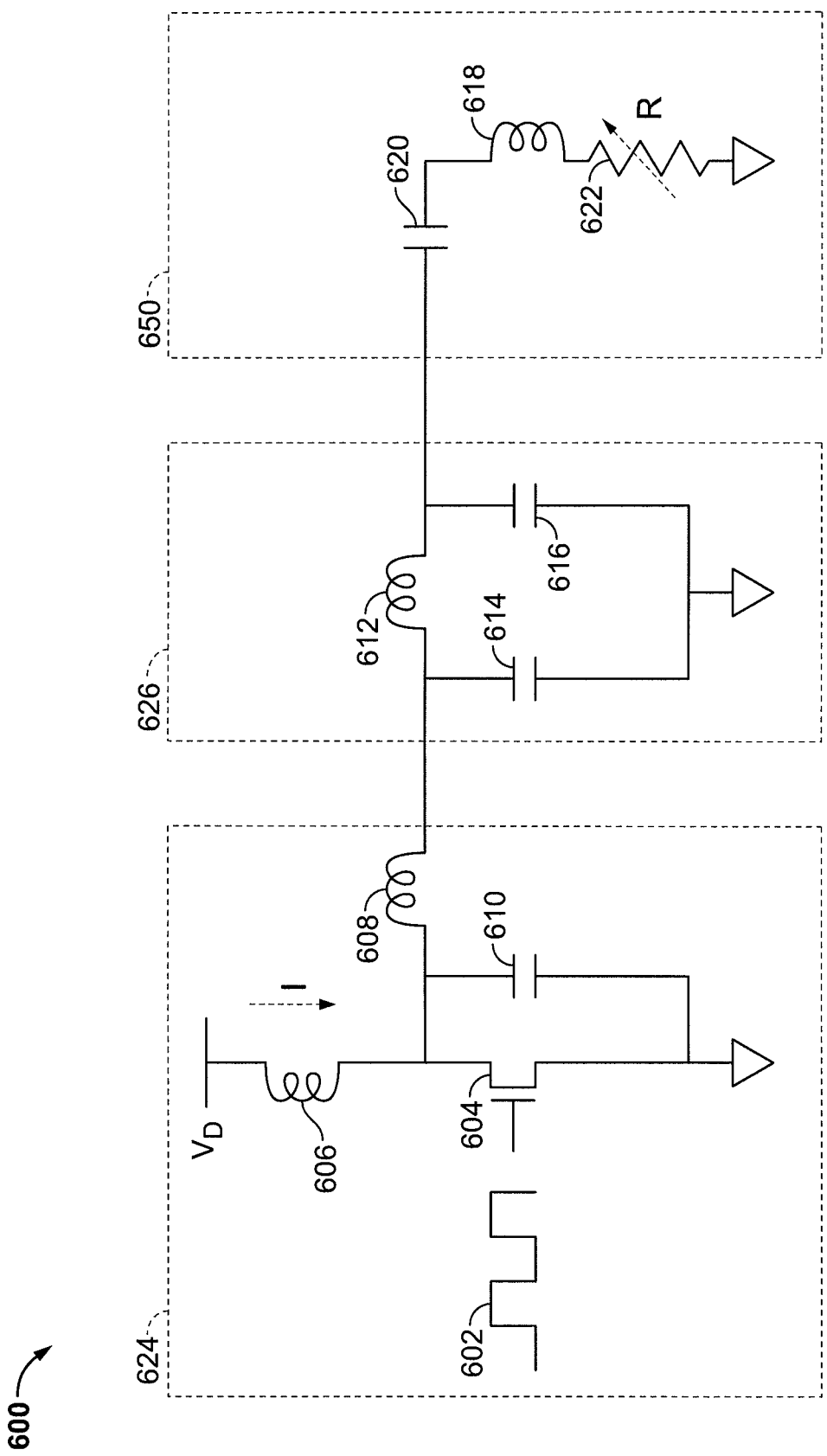
FIG. 6 is a schematic diagram of a portion of transmit circuitry that may be used in the transmit circuitry of FIG. 4, in accordance with exemplary embodiments of the invention.

FIG. 6 is a schematic diagram of a portion of transmit circuitry 600 that may be used in the transmit circuitry 406 of FIG. 4. The transmit circuitry 600 may include a driver circuit 624 as described above in FIG. 4. As described above, the driver circuit 624 may be a switching amplifier that may be configured to receive a square wave and output a sine wave to be provided to the transmit circuit 650. In some cases the driver circuit 624 may be referred to as an amplifier circuit. The driver circuit 624 is shown as a class E amplifier, however, any suitable driver circuit 624 may be used in accordance with embodiments of the invention. The driver circuit 624 may be driven by an input signal 602 from an oscillator 423 as shown in FIG. 4. The driver circuit 624 may also be provided with a drive voltage $V_D$ that is configured to control the maximum power that may be delivered through a transmit circuit 650. To eliminate or reduce harmonics, the transmit circuitry 600 may include a filter circuit 626. The filter circuit 626 may be a three pole (C 614, L 612, C 616) low pass filter circuit 626.

The signal output by the filter circuit 626 may be provided to a transmit circuit 650 comprising a coil 618. The transmit circuit 650 may include a series resonant circuit having a capacitance 620 and inductance (e.g., that may be due to the inductance or capacitance of the coil) that may resonate at a frequency of the filtered signal provided by the driver circuit 624. The load of the transmit circuit 650 may be represented by the variable resistor 622. The load may be a function of a wireless power receiver 508 that is positioned to receive power from the transmit circuit 650.

Figure 7A:
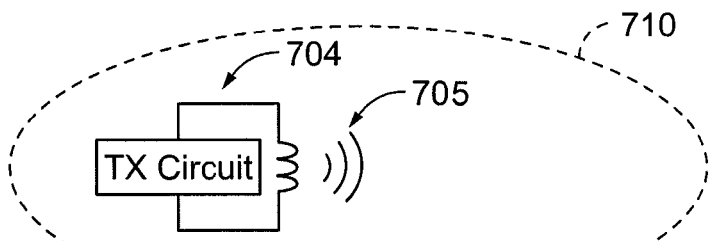
FIGS. 7A, 7B, 7C, and 7D are simplified block diagrams illustrating a beacon power mode for transmitting power between a transmitter and a receiver, in accordance with exemplary embodiments of the invention.

As described above, power may be wasted if the transmitter device is wirelessly transmitting power when no receivers are present. Rather than having a manual switch for activating the transmitter, the transmitter 404 may be configured to selectively transmit power based on the presence of a wireless power receiver 508 while using minimal power when no receivers are present. FIGS. 7A, 7B, 7C, and 7D are simplified block diagrams illustrating a beacon power mode for transmitting power between a transmitter 704 and a receiver 708, in accordance with exemplary embodiments of the invention. FIG. 7A illustrates a transmitter 520 having a low power "beacon" signal 705 when there are no receive devices in the beacon coupling-mode region 710 (i.e., positioned close enough to be able to adequate power from beacon signal). The beacon signal 705 may be, as a non-limiting example, such as in the range of ~10 to ~20 mW RF. This signal may be adequate to provide initial power to a device to be charged when it is placed in the coupling-mode region. In some embodiments, the low power beacon signal may be output by altering the duty cycle of the input signal 602 as shown in FIG. 6. For example the duty cycle may be lowered to 10%, for example, such that power is output for a small fraction of the total duty cycle. The duty cycle may be set to a variety of ranges such as, but not limited to substantially 5% to 30%.

Figure 7B:
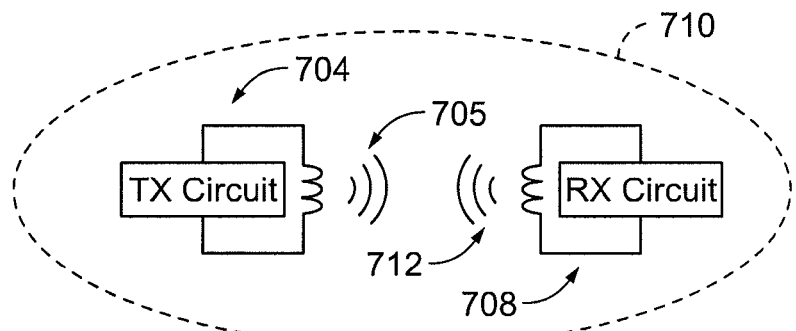

FIG. 7B illustrates a receive device 708 placed within the beacon coupling-mode region 710 of the transmitter 704 transmitting the beacon signal 705. The transmitter 704 may detect that the receiver 708 is receiving power. For example, the additional power may be sensed by the load sensing circuit 416 (FIG. 4) of the transmitter 704. As a result, the transmitter 704 may enter a high power mode.

Figure 7C:
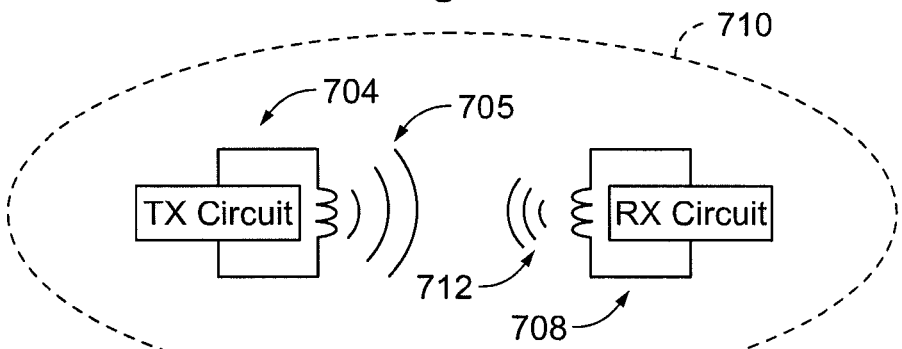

FIG. 7C illustrates the transmitter 704 generating a higher power signal 705' resulting in a higher power coupling-mode region 710'. As long as the receive device 530 is accepting power and, the transmitter may be able to detect the presence of the receiver 708 and will remain in the higher power state. While only one receive device 708 is illustrated, multiple receive devices may be present in the coupling-mode region 710. If there are multiple receive devices they may share the amount of power transmitted by the transmitter 704 based on how well each receiver 708 is coupled. For example, the coupling efficiency may be different for each receiver 708 depending on where the device is placed within the coupling-mode region 710.

Figure 7D:
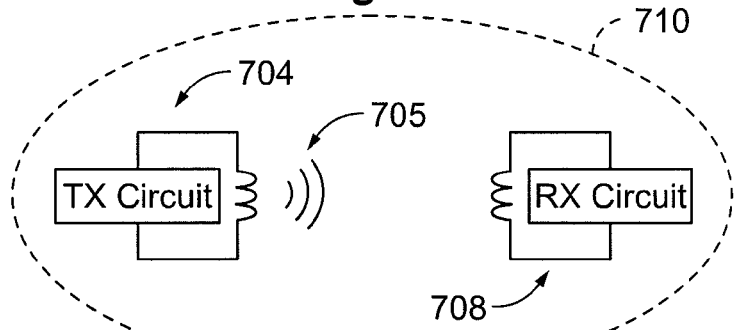

FIG. 7D illustrates the transmitter 704 generating the beacon signal 705 even when a receiver 708 is in the beacon coupling-mode region 710. This state may occur when receive device 708 is shut off, or the device cloaks itself, perhaps because it does not need any more power.

In some embodiments, a receiver and a transmitter may communicate on a separate communication channel (e.g., Bluetooth, zigbee, etc). With a separate communication channel, the transmitter may determine when to switch between beacon mode and high power mode, or create multiple power levels, based on the number of receive devices in the coupling-mode region 510 and their respective power requirements.

In order to conserve power, it is advantageous to minimize the amount of power output by the beacon signal. However, in some cases, the lower the power output level of the beacon signal, the more difficult it may be to detect power consumption to wake the transmitter from the low power beacon mode. Furthermore, it is also advantageous to wake up from beacon mode as soon as possible once the transmitter 704 detects the presence of a receiver 708 that wishes to receive power. For example, a receiver 708 may not initially have any source of power other than from the transmitter 704. If the receiver 708 is powered via a battery that has no remaining charge, then the only source of power for the receiver 708 may be from the wireless power transmitter 704. In this case, it is advantageous for the transmitter 704 operating in a low power beacon mode to detect the presence of the receiver 708 as soon as possible to supply adequate power to the receiver to perform various functions and provide power to the battery. As such, certain aspects of exemplary embodiments described herein are directed to enabling a transmitter 704 to more easily detect the presence of a receiver 708 while transmitting a beacon signal at the lowest amount of power possible. In some embodiments, the receiver 708 may have no other source of electric power other than the transmitter 704 and may use the beacon signal to actively signal the transmitter 704.

Figure 8:
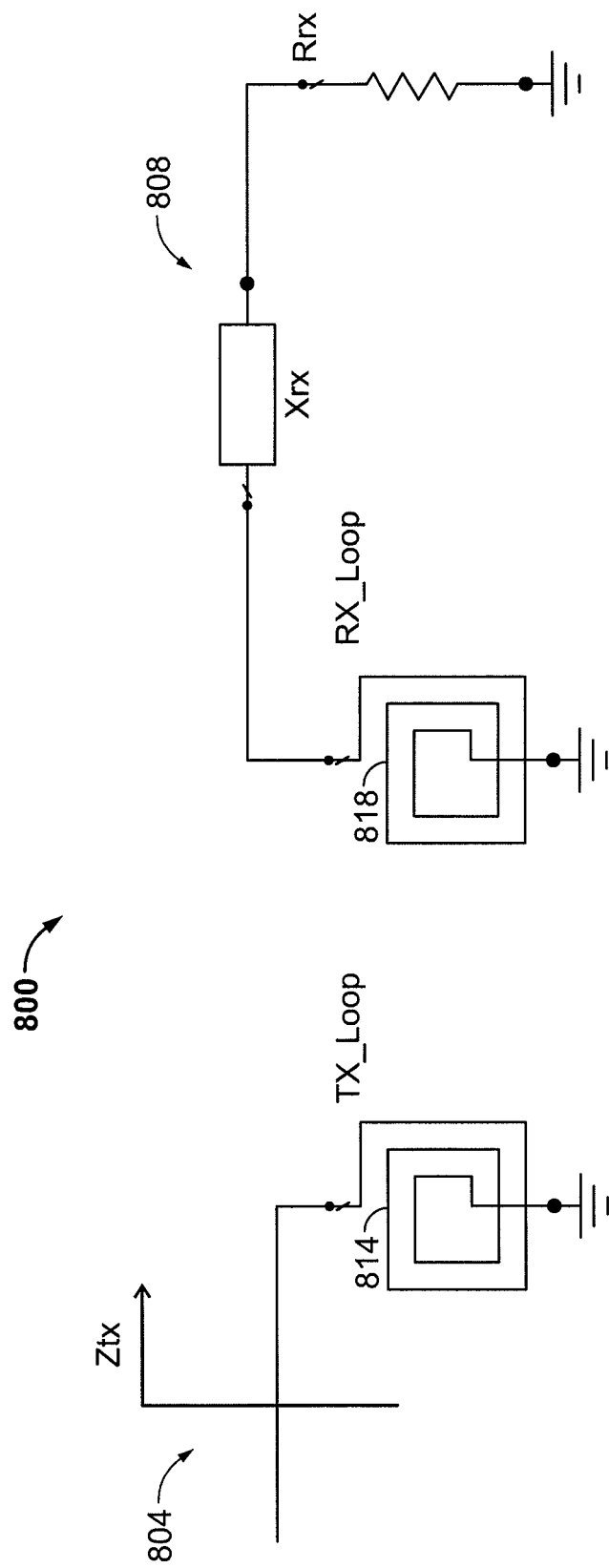
FIG. 8 is a schematic diagram of a simplified wireless charging system to illustrate the effect of the load of a receiver device on the impedance of a transmit coil.

When a receiver 708 is positioned within the field output by the transmitter 704 and is able to or enabled to receive power from the transmitter 708, various transmitter operating characteristics may be altered due to the power being coupled from the field the transmitter is generating. FIG. 8 is a schematic diagram of a simplified wireless charging system 800 to illustrate the effect of the load of a receiver device 808 on the impedance of a transmit coil 814. The transmitter 804 has an impedance $Z_{tx}$ when "looking into" the transmit coil 814. The receiver 808 with a receive coil 818 may be characterized as a portion of the load the transmitter 804 is driving. The load may have an impedance that is represented by the reactance $X_{rx}$ of the receiver 808 (i.e., the imaginary load) and a resistance $R_{rx}$ of the receiver 808 (i.e., the real load). The impedance $Z_{tx}$ of the transmit coil 814 due to the presence of a receiver actively coupling with the output of the transmitter 708 may be determined by the following impedance transformation shown in Equation 1.

$$Z_{tx} = \frac{\omega^2 M_{12}^2 R_{rx}}{R_{rx}^2 + (\omega M_{22} + X_{rx})^2} + j\left(\omega M_{11} - \frac{\omega^2 M_{12}^2 (\omega M_{22} + X_{rx})}{R_{rx}^2 + (\omega M_{22} + X_{rx})^2}\right) \quad \text{Equation 1}$$

$Z_{tx}$=Impedance looking into the transmit coil 814,
$\Omega$=Frequency in radians,
$M_{11}$=Self inductance of the transmit coil 814,
$M_{22}$=Self inductance of the receive coil 818,
$M_{12}$=Mutual inductance between the transmit coil 814 and the receive coil 818,
$R_{rx}$=Real load of the receiver 808, and
$X_{rx}$=Imaginary load of the receiver 808.

If both the transmit coil 814 and receive coil 818 are series tuned (i.e., configured to resonate at a common frequency), then the equation above may be simplified such that the impedance $Z_{tx}$ of the transmitter 708 may be determined by the following impedance transformation shown in Equation 2 as the self inductance of each of the transmit coil 814 and the receive coil 818 along with the reactive components generally cancel each other.

$$Z_{tx} = \frac{\omega^2 M_{12}^2}{R_{rx}} \quad \text{Equation 2}$$

As can be seen from Equation 2, there is an inverse relationship between the impedance $Z_{tx}$ and the real load $R_{rx}$ of the receiver 808. As such, changes in the real load $R_{rx}$ of the receiver 808 may cause a corresponding change in impedance $Z_{tx}$ at the transmit coil 818. More specifically, any decrease in the real load $R_{rx}$ of the receiver 508 results in an increased impedance $Z_{tx}$ at the transmit coil 814. Any increase in the impedance $Z_{tx}$ at the transmit coil 814 may result in an increase in the supply current of a power amplifier 424 configured to drive the transmit coil 814 (as the supply current of the power amplifier may change as a function of the load it drives). This increase in current may be sensed to detect the presence of a receiver. Sensing changes in supply current due to an increase in impedance may provide an additional mechanism for sensing a receiver 808.

Figure 9:
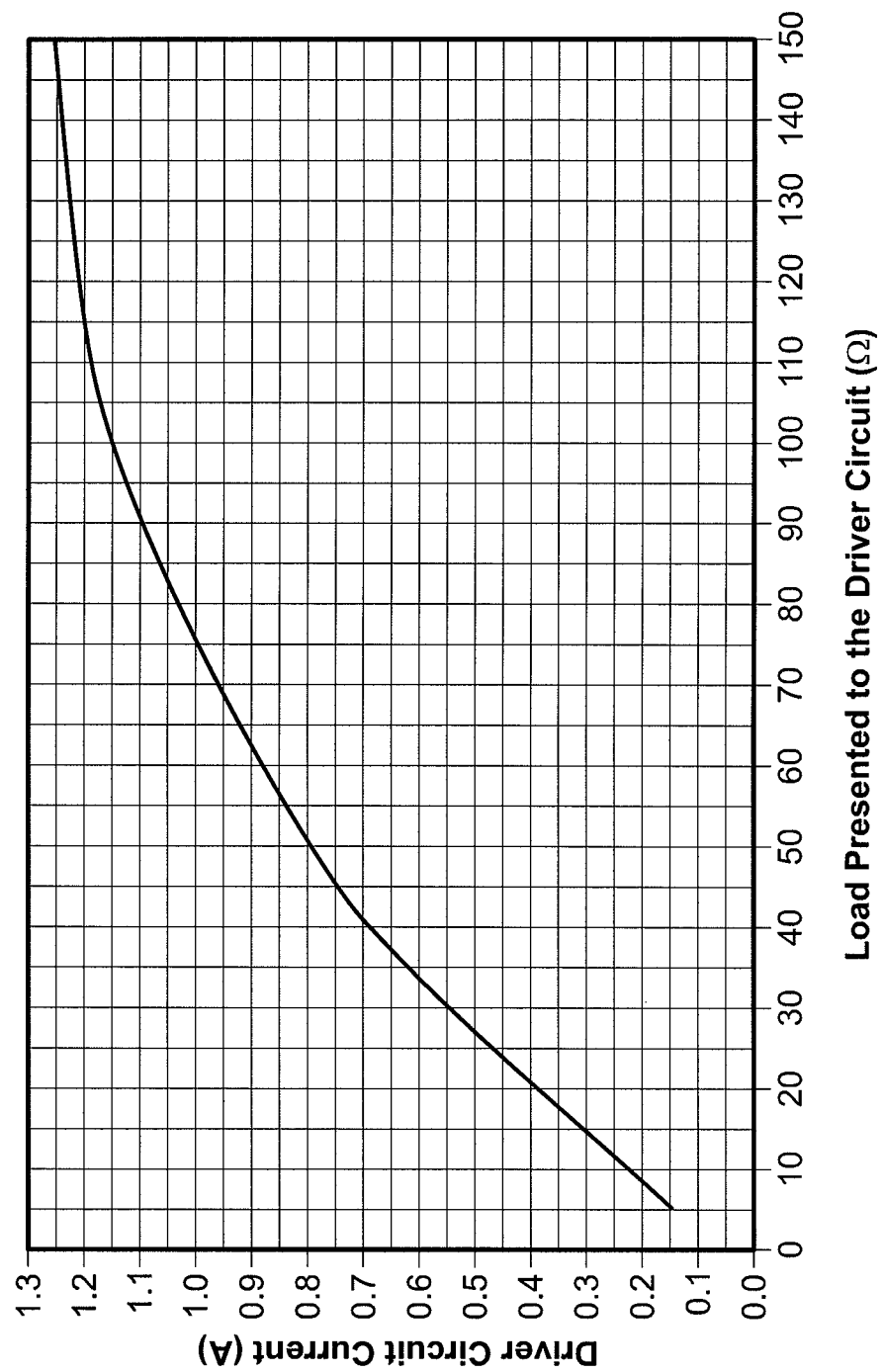
FIG. 9 is a plot showing the supply current of the driver circuit of the wireless power transmitter as a function of the load presented to the driver circuit.

FIG. 9 is a plot showing the supply current of the driver circuit 424 of the wireless power transmitter 804 as a function of the load presented to the driver circuit 424. As shown in FIG. 9, increasing the load impedance presented to the driver circuit 424 creates a corresponding increase in the supply current of the driver circuit 424. Using Equation 2 above, Equation 3 shows the relationship regarding the change in the supply current of the driver circuit 424 as the load at the receiver 808 decreases.

$$\downarrow R_{rx} = \uparrow Z_{tx} = \uparrow I_{PA} \quad \text{Equation 3}$$

If a receiver 808 can cause a significant increase in the load impedance presented to the driver circuit 424, the resulting increase in supply current to the driver circuit 424 may be more significant. The higher the increase in the supply current of the driver circuit 424, the easier it may be to detect the presence of a receiver 808 at the transmitter 404 to trigger a change in operating mode from the low power beacon mode. As such, if the receiver 808 can cause a significant change in its real load $R_{rx}$, the corresponding impedance $Z_{tx}$ change may result in a significant increase in the supply current of the driver circuit 424 for detecting the presence of the receiver 808.

Figure 10:
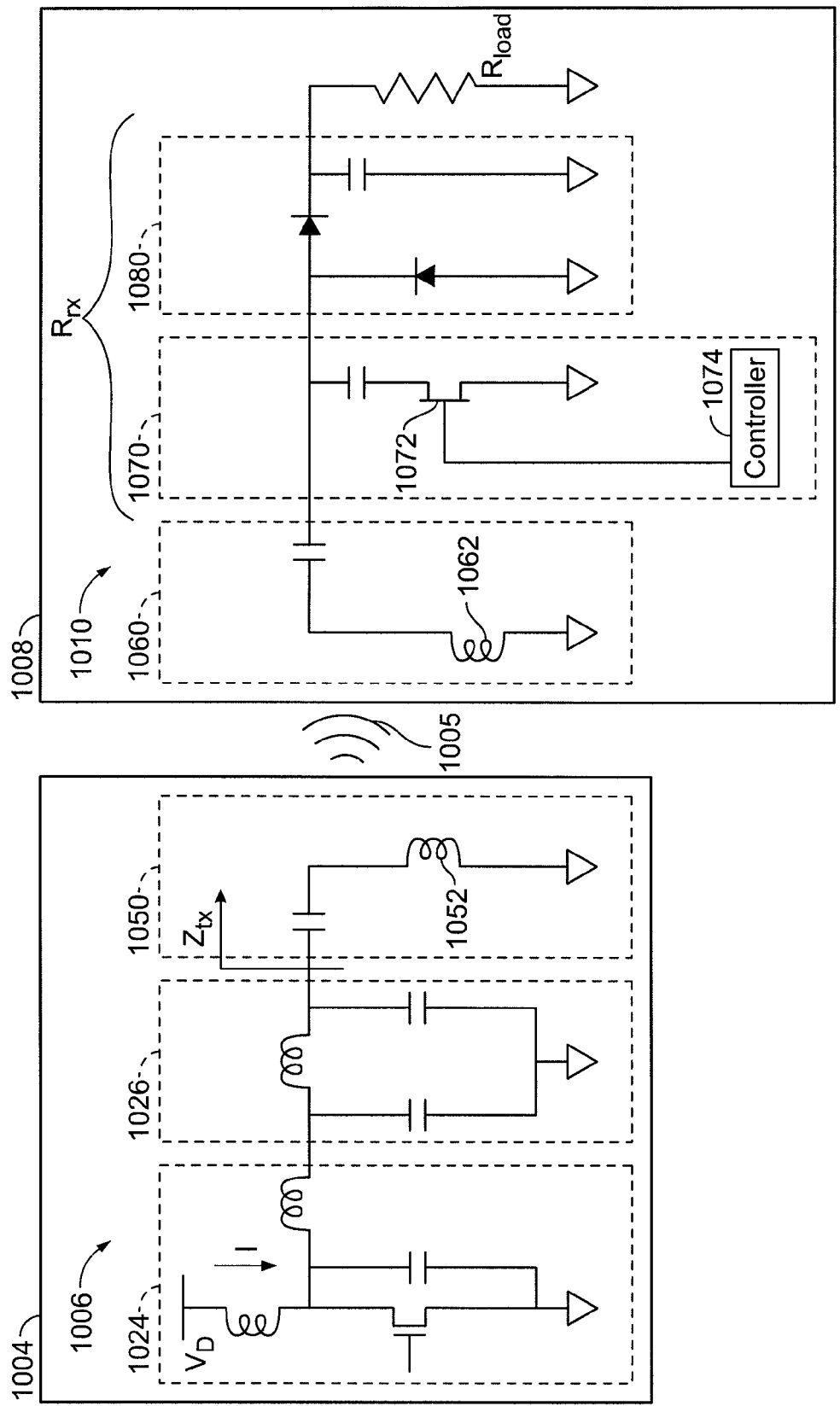
FIG. 10 is a schematic diagram of transmit circuitry as shown in FIG. 6 along with a portion of an exemplary wireless power receiver circuitry.

FIG. 10 is a schematic diagram of transmit circuitry 1006 as shown in FIG. 6 along with a portion of an exemplary wireless power receiver circuitry 1010, in accordance with exemplary embodiments of the invention. As in FIG. 6, the transmit circuitry 1006 may have a switching amplifier 1024 driving a transmit circuit 1050 (including a transmit coil 1052) via a filter circuit 1026.

Receive circuitry 1010 may include a receive circuit 1060 including a receive coil 1062. The receive coil 1062 may couple energy via a field 1005 output from the transmit coil 1052 as described above. The receive circuitry 1010 may further include rectifier circuitry 1080 configured to convert an AC signal produced by the receive circuit 1060 into a DC signal that may be used to charge a load $R_{load}$. In some embodiments, the load $R_{load}$ may include a battery (not shown) that may be charged via the DC signal output from rectifier circuitry 1080.

An adjustment circuit 1070 may be electrically connected between the receive circuit 1060 and the rectifier circuitry 1080. The adjustment circuit 1070 may be configured to adjust a characteristic of the load $R_{rx}$ of the receive circuitry 1010 for a period of time. Adjusting a characteristic of the load $R_{rx}$ may be done to cause a detectable change in an operating characteristic of a transmitter device 1004 to indicate its presence. More specifically, when the receive circuitry 1010 is positioned to be able to receive power from the field 1005 from a low power beacon signal, the adjustment circuit 1070 may be configured to operate so as to lower the real load $R_{rx}$ for a period of time. Lowering the real load $R_{rx}$ may cause an increase in the impedance $Z_{tx}$ looking into the transmit circuitry 1006. An increase in $Z_{tx}$ may be sensed by detecting an increase in supply current of a power driver circuit 1024 as described above. Detecting the increase may allow a transmitter 1004 to detect the presence of a receiver 1008 and waken from a low power mode to start delivering higher output power.

In one aspect, the adjustment circuit 1070 may be configured to maximize the reduction in the real load $R_{rx}$ for a period of time so as to produce a sharp increase in the impedance $Z_{tx}$ at the transmit circuit 1050. This results in a greater increase in the current of the driver circuit 1024 as shown in FIG. 9 that may be easier to detect. By causing a more dramatic increase in current, the power output in the low power beacon mode may be minimized as detection of the receive circuitry 1010 may be easier despite low output power. In one embodiment, a significant, but short term drop in $R_{rx}$ may be accomplished by including a selectively enabled short in the adjustment circuit 1070. The adjustment circuit 1070 may include a switch 1072 such as a field effect transistor (FET) or other switching component. The switch 1072 may be selectively controlled by a controller circuit 1074 to temporarily short the switch 1072. The short may create a sharp decrease in the real load $R_{rx}$ and corresponding sharp increase in the impedance $Z_{tx}$ and resulting increase in the supply current of the driver circuit 1024 to make it easier for the transmitter 1004 to detect the presence of the receiver 1008. As the short created by the adjustment circuit 1070 may consume large amounts of power, the switch 1072 may be closed for only a short period, just enough for the transmitter 1004 to be able to detect the presence of a receiver 1008 and awaken from the low power beacon mode. This provides a mechanism for the receive circuitry 1010 to actively adjust an operating characteristic to wake a transmit circuitry 1006 from a low power beacon mode.

The adjustment circuit 1070 of FIG. 10 shows how reducing the $R_{rx}$ may be accomplished by using a shorted switch 1072. A variety of other methods and techniques may be used by the adjustment circuit 1070 to adjust an operating characteristic (e.g., reducing $R_{rx}$ in some way) for a short period of time for signaling a wireless power transmitter to wake from a low power beacon mode.

In some embodiments, the source of power for actively adjusting the operating characteristic (e.g., real load $R_{rx}$) may be derived substantially or wholly from a low power beacon signal output by a transmitter 1004. For example, a battery that normally provides power to the receiver 1008 may have no remaining charge and be unable to provide power to be able to signal the transmitter 1004. In other embodiments, a receiver 1008 may receive all power wirelessly. As such, the receiver 1008 may need a way to signal its presence to the transmitter 1004 without relying on any other power sources besides the low beacon signal. In one embodiment, power received and rectified substantially from the low power beacon may be used to power the controller 1074 to selectively short the switch 1072 for a short period of time for allowing the transmitter 1004 to detect a change and wake from the low power beacon mode. In some embodiments, the controller 1074 may be, or is part of, a processor 516 as shown in FIG. 5 that performs a variety of functions for controlling the operation of the receiver. Received power from the beacon signal may be used to activate and power the processor 516 to selectively activate the switch 1072 for a period of time to decrease $R_{rx}$ during an initialization process performed by the receiver when initially powered on.

In other embodiments, the controller 1074 for an adjustment circuit 1070 may be independent of a processor 516 that more generally controls operations of the receiver 1008. The controller 1074 may be able to receive power via a rectifier 1080 derived from the low power beacon signal to selectively short the switch 1072. For example, in some embodiments, a general processor 516 may require more power than is delivered by a beacon signal. The adjustment circuit 1070 and controller 1074 may be able to use the power from the beacon signal to signal its presence to the transmitter 1004 as described above. Once the transmitter 1004 begins outputting at a higher power level, the processor 516 may be activated and the receiver 1008 may operate normally. As such, one aspect of certain embodiments allows a receiver to effectively signal its presence by using power wholly or substantially derived from a low power beacon signal. Several benefits may be obtained, particularly where the receiver 1008 may not initially have its own power source. Furthermore, by sharply reducing its real load $R_{rx}$ (e.g., via a temporary short) a transmitter 1004 may more easily be able to detect the presence of the receiver 1008 to begin outputting higher power levels. Easier detection may allow the beacon signal to have a minimum strength while still being able to easily detect the receiver 1008.

Figure 11:
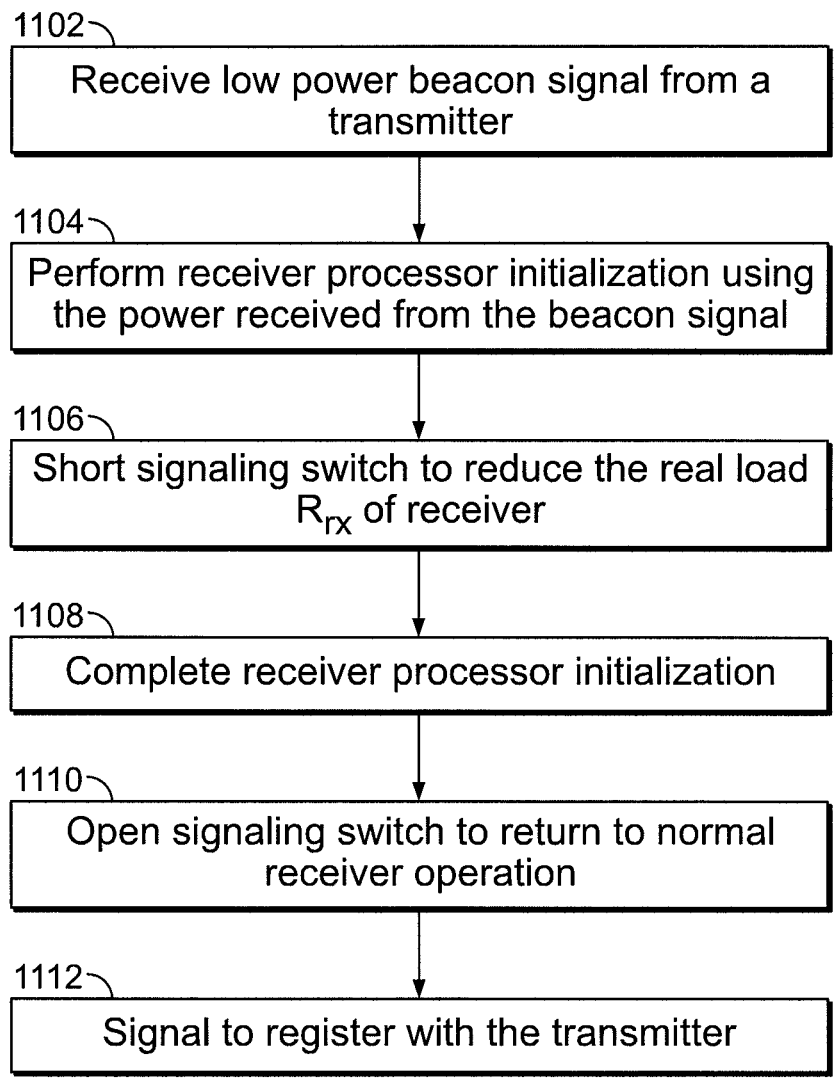
FIG. 11 is a flowchart of an exemplary method for waking a wireless power transmitter from a low power beacon mode, in accordance with exemplary embodiments of the invention.

FIG. 11 is a flowchart of an exemplary method for waking a wireless power transmitter 1004 from a low power beacon mode, in accordance with exemplary embodiments of the invention. It should be appreciated that while FIGS. 1-10 show various configurations and/or components or portions of transmitters and receivers, any of the components or portions shown may be included within any of the functional receiver or transmitter blocks of any of FIGS. 1-10. For example, a component shown in a transmitter of FIG. 4 may be included in any of the transmitter blocks of FIGS. 6-10 and vice versa. The method may begin in block 1102 when a receiver 1008 is positioned to be able to receive a lower power beacon signal from a transmitter 1004. As described above, the beacon signal may be output at a low duty cycle (e.g., around 10%) to conserve power. In block 1104, the receiver 1008 may use the received power to provide power to a receiver processor that may begin to perform a initialization process. As part of the initialization process, the receiver 1008 may short a signaling switch 1072 that temporarily reduces a real load $R_{rx}$ of the receiver 1008 as shown in block 1006. This may cause a corresponding change in the impedance $Z_{tx}$ of the transmitter 1004 such that the transmitter 1004 is able to detect the presence of the receiver 1008 and begin delivering power at a higher level as compared to the power level of the low power beacon signal. In block 1108, the receiver 1008 may complete the initialization process.

In block 1110, the receiver 1008 may open the signaling switch 1072 to return the receiver 1008 to a normal operation mode. The amount of time that the switch 1072 is shorted may be configured to be just long enough to ensure that the transmitter 1004 is able to detect a change in the load of the driver circuit 1024 to be able to determine that a receiver 1008 is present. This may allow the transmitter 1004 to wake up from beacon mode within the shortest possible time while consuming minimum power to output the beacon signal. Additionally, as the signaling switch 1072 burns a significant amount of power while shorted, the signaling switch 1072 may be configured to only be shorted for a brief amount of time to prevent damage to the receiver 1008. In block 1112, the receiver 1008 may then signal to register with the transmitter 1004.

Figure 12:
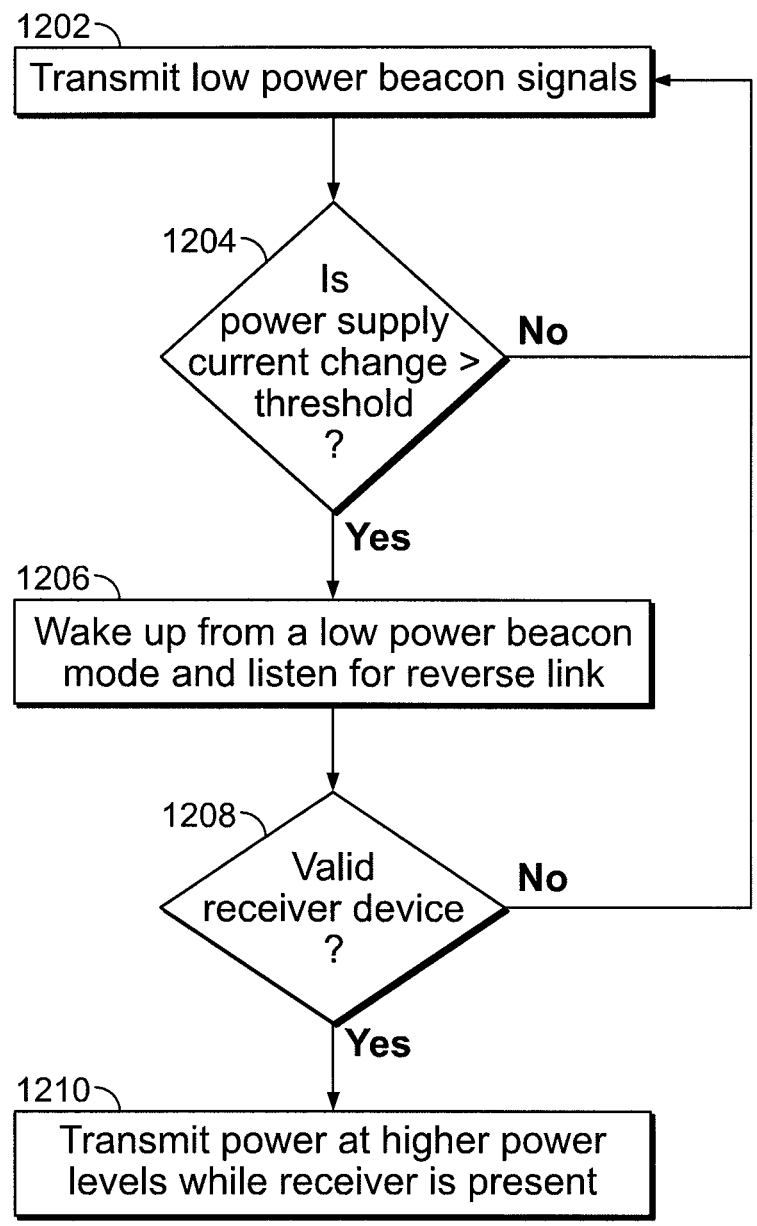
FIG. 12 is a flowchart of an exemplary method for waking from a low power beacon mode, in accordance with exemplary embodiments of the invention.

FIG. 12 is a flowchart of an exemplary method for waking from a low power beacon mode, in accordance with exemplary embodiments of the invention. In block 1202, a transmitter 1004 may transmit low power beacon signals when a receiver 1008 is not present to receive power. In decision block 1204, the transmitter 1004 may determine whether a change in current of a power supply (e.g., to a driver circuit 1024) is above a threshold. A high enough change in current may correspond to a receiver signaling its presence as described above. If the increase in current is not above the threshold, then the transmitter 1004 may resume transmitting low power beacon signals. If the change in current is above a threshold, then the transmitter 1004 may wake up from a low power beacon mode and listen for a receiver 1008 on reverse link. The receiver 1008 may send a signal to register with the transmitter 1004 and the transmitter 1004 may determine whether the receiver 1008 is able to receive power valid through some type of authentication and/or verification process as shown in decision block 1208. If the receiver 1008 is not permitted to receive power, then the transmitter 1004 may resume transmitting low power beacon signals. If the receiver 1008 is validated, then the transmitter 1004 may enter a higher power mode (as compared to the beacon mode) and transmit power at a higher power level while the receiver 1008 is present.

In some embodiments, the transmitter 1004 may wait to start transmitting higher power levels until communication has been completed between the transmitter 1004 and receiver 1008 to determine whether the receiver 1008 is permitted to receive power as shown in FIG. 12. In other embodiments, once the transmitter 1004 detects a receiver 1008 is present, the transmitter 1004 may immediately begin outputting power at increased power levels. Any authentication and/or verification may happen once the receiver starts receiving power at higher levels. This may be helpful in cases where the receiver 1008 has no other current power source than the low power beacon signals output from transmitter 1004. This may allow the transmitter 1004 to lower the power output level of the beacon signal to a level that is just high enough to allow the receiver 1008 to actively signal its presence using power derived substantially or wholly from the beacon signal. As described by exemplary embodiments above, significantly reducing the real load $R_{rx}$ through, for example, creating a temporary short, may provide a mechanism requiring little power to quickly awaken the transmitter 408.

Figure 13:
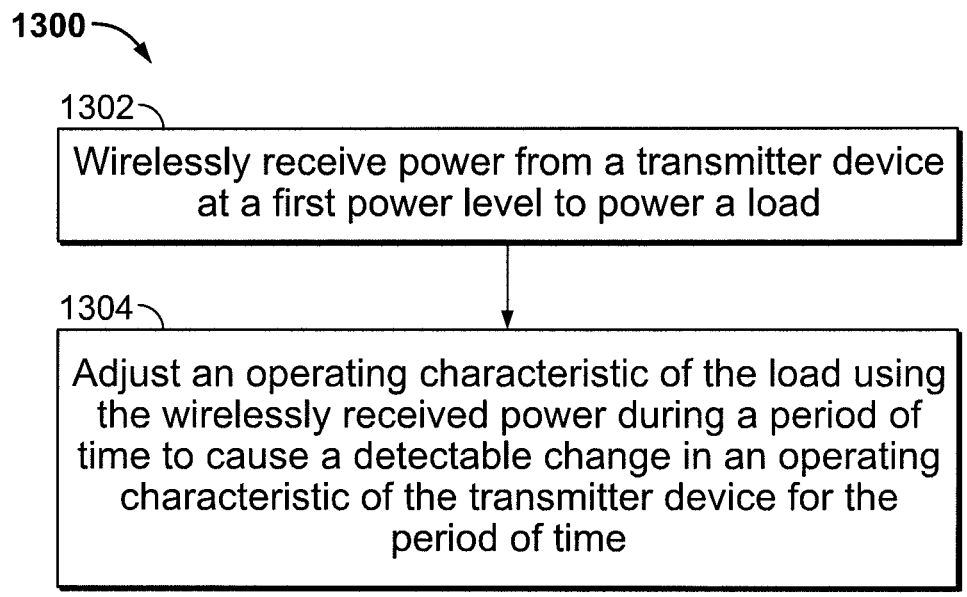
FIG. 13 is a flowchart of another exemplary method for waking a wireless power transmitter from a low power beacon mode, in accordance with exemplary embodiments of the invention.

FIG. 13 is a flowchart of another exemplary method for waking a wireless power transmitter 1004 from a low power beacon mode, in accordance with exemplary embodiments of the invention. In block 1302, a receiver 1008 may wirelessly receive power from a transmitter 1004 at first power level to power a load. The load may include the various circuitry and components of the receiver 1008. The wirelessly received power may be from a low power signal from a transmitter operating in a low power mode. In block 1304, the receiver 1008 may adjust an operating characteristic of the load using the wirelessly received power during a period of time to cause a detectable change in an operating characteristic of the transmitter 1004 for the period of time. For example, as described above, the receiver 1008 may short a portion of the receive circuitry 1010 to reduce its real load $R_{rx}$. This may cause a detectable change in an amount of supply current, for example, going to a driver circuit 1024 of the transmitter 1004. Detecting the increase may awaken the transmitter 1004 from the low power mode to transmit at higher power levels for use by the receiver to power or charge the load.

Figure 14:
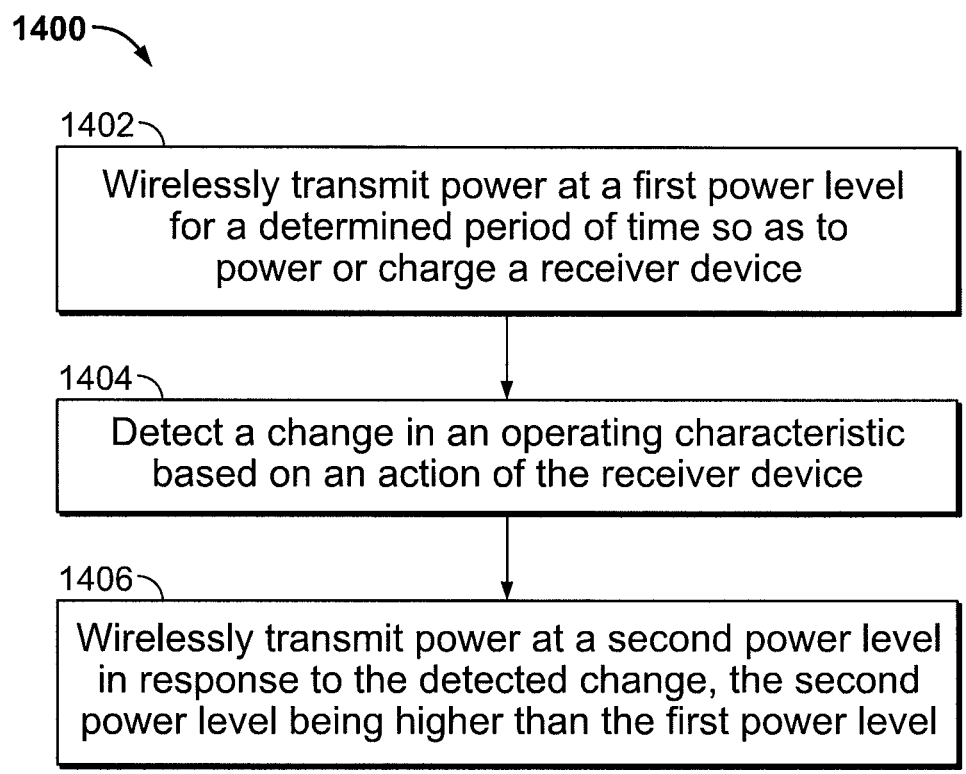
FIG. 14 is a flowchart of another exemplary method for waking from a low power beacon mode, in accordance with exemplary embodiments of the invention.

FIG. 14 is a flowchart of another exemplary method for waking from a low power beacon mode, in accordance with exemplary embodiments of the invention. In block 1402, a transmitter 1004 may wirelessly transmit power at a first power level, the power being wirelessly received by an unpowered receiver device to activate an adjustment circuit of the receiver device using the transmitted power. The first power level may correspond to a low beacon power signal as described above. In block 1404, the transmitter 1004 may detect a change in an operating characteristic based on an action of the adjustment circuit. For example, the transmitter 1004 may detect a change in a current to a driver circuit 1024 in response to the adjustment circuit 1070 causing a reduction in the real load $R_{rx}$ of the receiver 1008. In block 1406, the transmitter 1004 may wirelessly transmit power at a second power level in response to the detected change, the second power level being higher than the first power level. The second power level may correspond to a level of power transmitted after the transmitter 1004 wakens from beacon mode that may be at a level that may adequately power or charge the receiver 1008.

Figure 15:
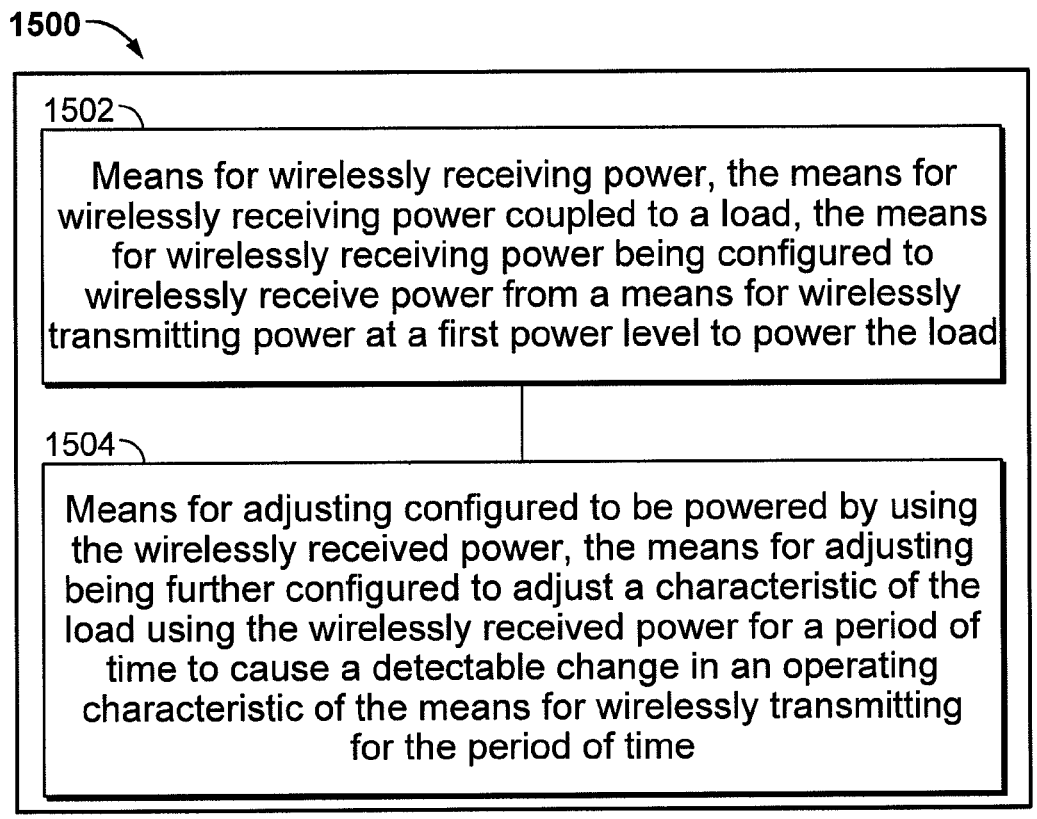
FIG. 15 is a functional block diagram of a wireless power receiver, in accordance with an exemplary embodiment of the invention.

FIG. 15 is a functional block diagram of a wireless power receiver 1500, in accordance with an exemplary embodiment of the invention. Wireless power receiver 1500 comprises means 1502 and 1504 for the various actions discussed with respect to FIGS. 1-14.

Figure 16:
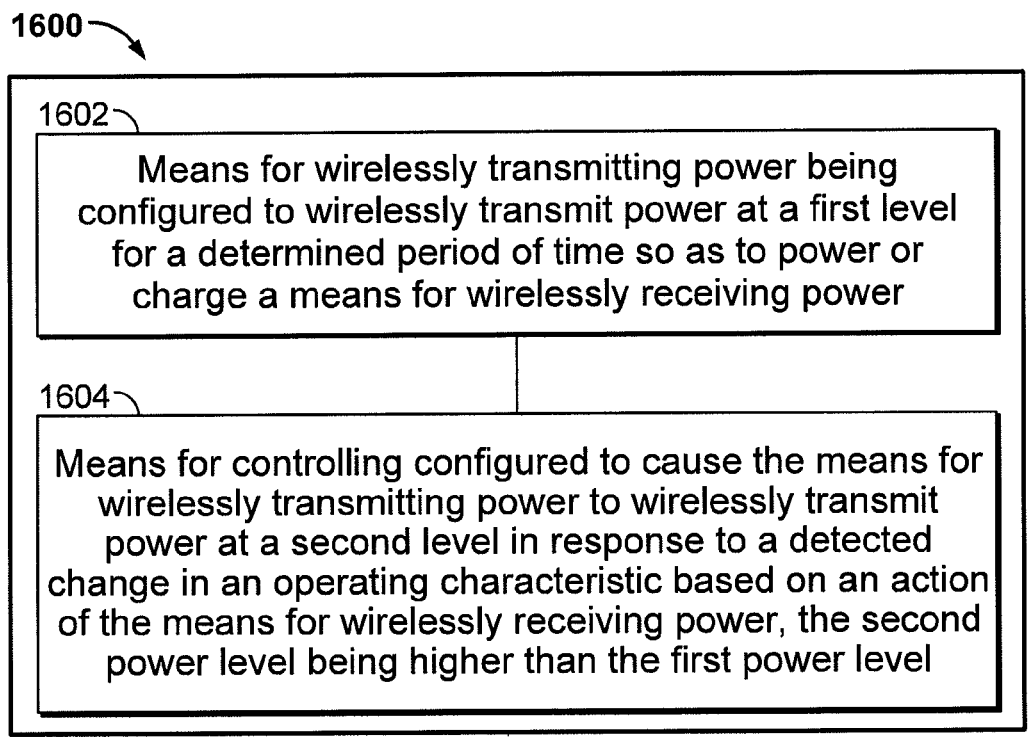
FIG. 16 is a functional block diagram of a wireless power transmitter, in accordance with an exemplary embodiment of the invention.

FIG. 16 is a functional block diagram of a wireless power transmitter 1600, in accordance with an exemplary embodiment of the invention. Wireless power transmitter 1600 comprises means 1602, 1604 and 1606 for the various actions discussed with respect to FIGS. 1-14.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. An exemplary storage medium is coupled to the processor such that the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer readable medium. Computer readable media includes both computer storage media and communication media including any medium that facilitates transfer of a computer program from one place to another. A storage media may be any available media that may be accessed by a computer. By way of example, and not limitation, such computer readable media may comprise RAM, ROM, EEPROM, CD ROM or other optical disk storage, magnetic disk storage or other magnetic storage devices, or any other medium that may be used to carry or store desired program code in the form of instructions or data structures and that may be accessed by a computer. Also, any connection is properly termed a computer readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. A wireless power receiver apparatus, comprising:
a receive circuit comprising a receive coil, the receive circuit being coupled to a load, the receive circuit being configured to wirelessly receive power from a transmitter device at a first power level or a second power level to power the load, wherein the first power level is lower than the second power level and corresponds to a low power mode of the transmitter device; and
an adjustment circuit configured to be powered by using the wirelessly received power, the adjustment circuit being further configured to adjust a characteristic of the load using the wirelessly received power for a period of time to cause a detectable change in an operating characteristic of the transmitter device for the period of time.

2. The wireless power receiver apparatus of claim 1, wherein the receive circuit is configured to wirelessly receive power from the transmitter device at the second power level in response to the change in the operating characteristic of the transmitter device.

3. The wireless power receiver apparatus of claim 1, wherein the characteristic of the load comprises an impedance of the load.

4. The wireless power receiver apparatus of claim 3, wherein the adjustment circuit is configured to lower the impedance of the load.

5. The wireless power receiver apparatus of claim 1, wherein the adjustment circuit further comprises a switch, wherein the adjustment circuit is configured to adjust the characteristic of the load by altering a position of the switch.

6. The wireless power receiver apparatus of claim 5, wherein the switch comprises a transistor.

7. The wireless power receiver apparatus of claim 5, wherein the adjustment circuit is configure to close the switch to cause a short.

8. The wireless power receiver apparatus of claim 1, wherein the detectable change in the operating characteristic of the transmitter device comprises an increase in supply current to a driver circuit.

9. The wireless power receiver apparatus of claim 8, wherein the transmitter device is configured to wirelessly output power at the second power level when the increase in supply current is above a threshold.

10. A method for wirelessly receiving power, the method comprising:
    wirelessly receiving power from a transmitter device at a first power level or a second power level to power a load, wherein the first power level is lower than the second power level and corresponds to a low power mode of the transmitter device;
    adjusting an operating characteristic of the load using the wirelessly received power during a period of time to cause a detectable change in an operating characteristic of the transmitter device for the period of time.

11. The method of claim 10, wherein wirelessly receiving power from the transmitter device comprises wirelessly receiving power at the second power level in response to the change in the operating characteristic of the transmitter device.

12. The method of claim 10, wherein the characteristic of the load comprises an impedance of the load.

13. The method of claim 12, wherein adjusting the operating characteristic comprises lowering the impedance of the load.

14. The method of claim 10, wherein adjusting the operating characteristic comprises altering a position of a switch.

15. The method of claim 14, wherein adjusting comprises closing the switch to cause a short.

16. The method of claim 10, wherein the detectable change in the operating characteristic of the transmitter device comprises an increase in supply current to a driver circuit.

17. The method of claim 16, wherein the transmitter device is configured to wirelessly output power at the second level when the increase in supply current is above a threshold.

18. A wireless power receiver apparatus, comprising:
    means for wirelessly receiving power, the means for wirelessly receiving power being coupled to a load, the means for wirelessly receiving power being configured to wirelessly receive power from a means for wirelessly transmitting power at a first power level or a second power level to power the load, wherein the first power level is lower than the second power level and corresponds to a low power mode of the means for wirelessly transmitting power; and
    means for adjusting configured to be powered by using the wirelessly received power, the means for adjusting being further configured to adjust a characteristic of the load using the wirelessly received power for a period of time to cause a detectable change in an operating characteristic of the means for wirelessly transmitting for the period of time.

19. The wireless power receiver apparatus of claim 18, wherein the means for wirelessly receiving is configured to wirelessly receive power from the means for wirelessly transmitting at the second power level in response to the change in the operating characteristic of the means for wirelessly transmitting.

20. The wireless power receiver apparatus of claim 18, wherein the characteristic of the load comprises an impedance of the load.

21. The wireless power receiver apparatus of claim 20, wherein the means for adjusting is configured to lower the impedance of the load.

22. The wireless power receiver apparatus of claim 18, wherein the means for adjusting further comprising a means for switching, wherein the means for adjusting is configured to adjust a characteristic of the load by altering a position of the means for switching.

23. The wireless power receiver apparatus of claim 22, wherein the means for switching comprises a transistor.

24. The wireless power receiver apparatus of claim 22, wherein the means for adjusting is configure to close the means for switching to cause a short.

25. The wireless power receiver apparatus of claim 18, wherein the first power level corresponds to a low power mode of the means for wirelessly transmitting.

26. The wireless power receiver apparatus of claim 18, wherein the detectable change in the operating characteristic of the means for wirelessly transmitting comprises an increase in supply current to a driver circuit.

27. The wireless power receiver apparatus of claim 26, wherein the means for wirelessly transmitting is configured to wirelessly output power at the second level when the increase in supply current is above a threshold.

28. The wireless power receiver apparatus of claim 18, wherein the means for wirelessly receiving power comprises a receive circuit comprising a receive coil.

29. The wireless power receiver apparatus of claim 18, wherein the means for adjusting comprises an adjustment circuit.

30. The wireless power receiver apparatus of claim 18, wherein the means for wirelessly transmitting comprises a transmit circuit comprising a transmit coil.

* * * * *